(12) United States Patent
Lemoff et al.

(10) Patent No.: US 6,961,486 B2
(45) Date of Patent: Nov. 1, 2005

(54) NON-BLOCKING MECHANICAL FIBER OPTIC MATRIX SWITCH

(75) Inventors: Brian E. Lemoff, Union City, CA (US); Charles D. Hoke, Palo Alto, CA (US); Dale W. Schroeder, Scotts Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 483 days.

(21) Appl. No.: 09/873,127

(22) Filed: Jun. 1, 2001

(65) Prior Publication Data

US 2002/0181841 A1      Dec. 5, 2002

(51) Int. Cl.[7] ............................................... G02B 6/36
(52) U.S. Cl. ........................ 385/17; 385/25; 385/55; 385/60; 385/90
(58) Field of Search ...................... 385/17, 25

(56) References Cited

U.S. PATENT DOCUMENTS

| | | | | |
|---|---|---|---|---|
| 5,337,378 A | * | 8/1994 | Saito et al. | 385/16 |
| 5,436,987 A | * | 7/1995 | Saito et al. | 385/16 |
| 5,664,034 A | * | 9/1997 | Mock | 385/16 |
| 5,699,463 A | * | 12/1997 | Yang et al. | 385/22 |
| 6,296,397 B1 | * | 10/2001 | Bavington et al. | 385/53 |
| 6,307,982 B1 | * | 10/2001 | Takahashi | 385/16 |
| 6,335,993 B1 | * | 1/2002 | Takahashi | 385/25 |
| 2002/0076134 A1 | * | 6/2002 | Singh | 385/16 |

FOREIGN PATENT DOCUMENTS

| | | | | | |
|---|---|---|---|---|---|
| JP | 02099908 A | * | 4/1990 | | G02B 26/02 |
| JP | 06258584 A | * | 9/1994 | | G02B 26/08 |

* cited by examiner

*Primary Examiner*—Sung Pak

(57) ABSTRACT

A first plurality of stages each support a ferrule surrounding an end portion of a corresponding one of N optical input fibers. A second plurality of stages each support a ferrule surrounding an end portion of a corresponding one of M optical output fibers. Mechanical mechanisms translate the stages along a plurality of orthogonal X and Y axes to align a facet of a selected one of the N input optical fibers with a facet of a selected one of the M output optical fibers. The stages of the input optical fibers, the output optical fibers, or both, have mechanical mechanisms for moving the ferrules along Z axes perpendicular to the X and Y axes into and out of alignment holes of a central panel to physically mate the facets of the coupled fibers.

4 Claims, 3 Drawing Sheets

NON-BLOCKING MECHANICAL FIBER OPTIC MATRIX SWITCH

FIELD OF THE INVENTION

The present invention relates to telecommunications networks, and more particularly, to pure optical switches which direct light pulses from one optical fiber to another without electrical conversion.

BACKGROUND OF THE INVENTION

Telecommunications service providers continue to seek ever greater bandwidth at ever lower prices. Their data networks must be flexible to allow for continual upgrades, also referred to as "provisioning". They must also designed for rapid fault recovery to avoid service degradation and even outages. High speed optical data networks now carry most of the long haul, and much of the metropolitan area data traffic in developed countries. Along such networks microprocessor controlled routers perform so-called "OEO" transcriptions, converting optically encoded data received from input optical fibers to electrical signals, reading destination code, and then reconverting the electrical signals back to optically encoded data and sending it along output optical fibers. As transmission speeds pass 2.488 Gbits/sec (OC-48 level), this conversion step becomes more difficult to perform and the cost of conventional high throughput electrical switches becomes unacceptable.

Pure optical switches direct light pulses directly from one optical fiber to another without electrical conversion and therefore offer the promise of eliminating much of the OEO transcriptions in high bandwidth fiber optic data transmission networks. Electrical routing intelligence would still be needed to direct traffic. However, currently about eighty percent of the traffic handled by a conventional router passes straight through and reading the destination header in most cases is a waste of time and system resources, By separating the control information from the transmitted data, pure optical switching would bring substantial increases in the throughput rate of optical data networks.

In general a pure optical switch routes beams of light with encoded data from one or more input optical fibers to a choice of two or more output optical fibers. Fiberoptic switches are often described by the number of channels that they are capable of switching. For example, a 1×4 fiberoptic switch has one input fiber whose information light beam can switched among four different output optical fibers. A 4×4 fiberoptic switch allows switching between four input fibers and four output fibers. In a so-called "non-blocking fiberoptic matrix switch" any of the inputs can be connected to any of the outputs, provided that each input is only connected to one output.

A variety of miniature electromechanical devices have been developed for changing the path of light in free space to direct light pulses from one optical fiber to another optical fiber. One promising approach utilizes three dimensional (3D) microelectromechanical systems (MEMS). Generally speaking, MEMS fabrication technology involves shaping a multi-layer monolithic structure by sequentially depositing and configuring layers of a multi-layer wafer. The wafer typically includes a plurality of polysilicon layers that are separated by layers of silicon dioxide and silicon nitride. The shaping of individual layers is done by etching that is controlled by masks patterned by photolithographic techniques. MEMS fabrication technology also entails etching intermediate sacrificial layers of the wafer to release overlying layers for use as thin elements that can be easily deformed and moved. Further details of MEMS fabrication technology may be found in a paper entitled "MEMS The Word for Optical Beam Manipulation" published in *Circuits and Devices*, July 1997, pp. 11–18. See also "Multiuser MEMS Processes (MUMPS) Introduction and Design Rules" Rev. 4, Jul. 15, 1996 MCNC Mems Technology Applications Center, Research Triangle Park, N.C. 27709 by D. Keoster, R. Majedevan, A. Shishkoff and K. Marcus.

Optical switches that employ moving mirrors have several drawbacks. They can have large insertion losses resulting from beam divergence between the input and output fibers. This loss scales upwards as the number of channels increases since larger propagation distances are required. Precise angular alignment of the mirrors is also required to minimize optical losses. In addition, the long term reliability of micro-machined tilting mirrors has yet to be firmly established. Furthermore, in some designs, bi-stable mirrors can maintain their state in the absence of power, however, many optical switch designs that employ moving mirrors require continuous power to maintain a fixed state.

Micro-fluidic total internal reflection optical switches have also been developed. Two arrays of optical waveguides cross each other. A fluid filled trench is created at each crossing point. If fluid is present at an interface, light from and incident waveguide will propagate across the trench, continuing along the same path as that of the incident waveguide. If a bubble is present at the interface, then light from the incident waveguide will be reflected by total internal reflection, thus coupling into another waveguide belonging to the array crossing the incident array. This optical switch design has several disadvantages. Optical losses accrue each time light is transmitted across a fluid filled trench. The total optical losses scale upwards in proportion to an increasing number of channels. Furthermore, the micro-fluidic optical switch requires a continuous source of power to maintain a fixed state. The long term reliability and environmental stability of micro-fluidic optical switches has yet to be firmly established.

Acousto-optic waveguide optical switches have also been developed. However, they require an inordinately large number of 1×2 cascading units, making them costly and generating substantial insertion losses. They also require power to maintain a fixed state.

Lens-based mechanical fiberoptic switches have also been developed. Light from an input fiber is collimated by a lens and then focused by a second lens onto an output fiber. In one version, an array of output fibers can be translated mechanically to select one fiber in the array to be at the focal point of the focusing lens. In another version, a mirror is rotated to reflect the collimated input beam to a selected output lens, thus focusing the beam into a selected output fiber. This type of switch is limited to 1×N configurations and the precision optical alignment of all of the fibers and lenses is required, greatly increasing the cost of this type of optical switch.

Proximity-based mechanical fiberoptic switches have also been designed in which an input fiber is in close proximity to a moveable array of output fibers. By translating the output array, an output optical fiber can be selected. This design suffers from the drawback that it is limited to 1×N configurations.

Of course, mechanical fiberoptic patch panels have existed which require a human operator to physically plug and unplug ferruled optical fibers into appropriate sockets. The severe disadvantages in speed and efficiency of this type of crude fiberoptic switch are readily apparent.

It would therefore be desirable to provide a reliable N×N non-blocking mechanical fiberoptic matrix switch. Its switching speed would be significantly less than that of some of the other pure optical switches identified above. However, there is still a need for this type of fiberoptic switch where switching speed is not critical and channel re-routing occurs very infrequently. This can occur, for example, where new equipment is being brought on line, data paths are being re-routed to bypass defective equipment or add capacity, and so forth. Furthermore, there is a need for an N×N non-blocking fiberoptic matrix with very low insertion losses.

SUMMARY OF THE INVENTION

In accordance with the present invention, a non-blocking mechanical fiberoptic matrix switch has N input optical fibers and M output optical fibers. A first plurality of stages each support an end portion of a corresponding one of the N optical fibers. A second plurality of stages each support an end portion of a corresponding one of the M optical fibers. Mechanical mechanisms translate the stages along a plurality of overlapping paths to align a facet of a selected one of the N input optical fibers with a facet of a selected one of the M output optical fibers. The facets of the coupled fibers need not physically contact each other in which case a lens or other collimating device is attached to each fiber. Alternatively, the stages of the input fibers, the output fibers, or both, can have mechanical mechanisms for moving the fibers along Z axes perpendicular to the X and Y axes. The stages can move ferrules surrounding the ends of the fibers into and out of alignment holes of a central panel to physically mate opposing facets of the coupled fibers. Alternatively, the central panel can be eliminated by attaching flexible sleeves to the ends of either the input fibers or the output fibers.

The present invention also provides a method of switching beams of light directly between selected ones of N input optical fibers and M optical output fibers. The method involves the steps of supporting an end portion of each of a plurality of N input optical fibers for independent translational movement along a first set of paths, and supporting an end portion of each of a plurality of M output optical fibers for independent translational movement along a second set of paths that overlap the first set of paths. A selected one of the N input optical fibers and a selected one of the M output optical fibers are translated to align the fibers to permit a light beam to be transmitted from the selected input optical fiber to the selected output optical fiber.

DESCRIPTION OF THE PREFERRED EMBODIMENTS

Figure 1:
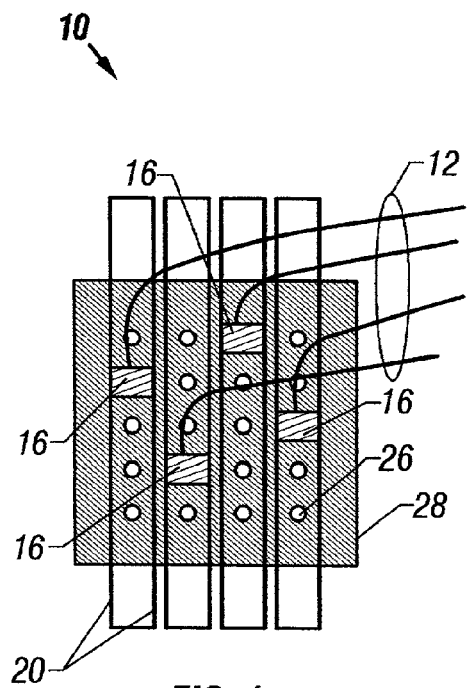
FIG. 1 illustrates in diagrammatic form the input side of a preferred embodiment of our non-blocking mechanical fiberoptic matrix switch.
Figure 2:
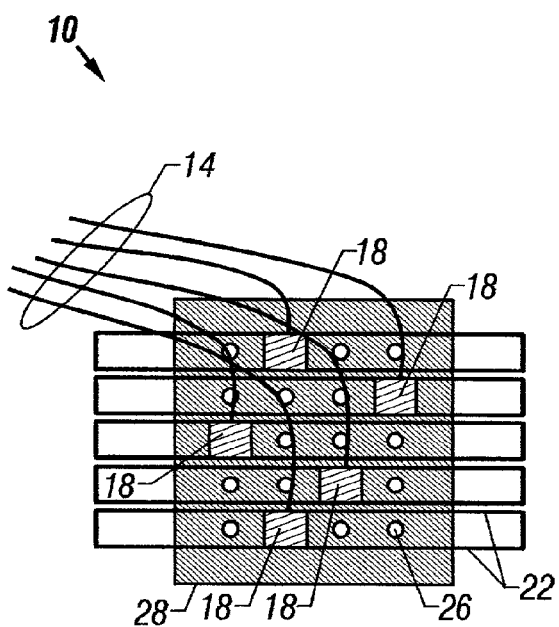
FIG. 2 illustrates in diagrammatic form the output side of the non-blocking mechanical fiberoptic matrix of FIG. 1.

FIG. 1 illustrates, in diagrammatic form, the input side of a non-blocking mechanical fiberoptic matrix switch 10 that has N=4 input optical fibers 12. FIG. 2 illustrates, in diagrammatic form, the output side of the non-blocking mechanical fiberoptic matrix switch 10 that has M=5 output optical fibers 14. The optical fibers 12 and 14 are each conventional in form and dimensions. For example, they may be made of a highly pure single-mode glass core with a nine micro-meter diameter surrounded by a glass cladding having an index of refraction which is a step below that of the core. Four stages 16 each support an end portion of a corresponding one of the input optical fibers 12. Five stages 18 each support an end portion of a corresponding one of the output optical fibers 14. Mechanical mechanisms hereafter described move the four stages 16 along a plurality of parallel vertical Y axes defined by spaced apart pairs of rails 20 and the five stages 18 along a plurality of parallel horizontal X axes defined by spaced apart pairs of rails 22. This enables alignment of a facet of a selected one of the input optical fibers 12 with a facet of a selected one of the output optical fibers 14. The optical fibers 12 and 14 are each sufficiently flexible to permit their end portions to be moved by the stages 16 and 18 while a segment connected to each end portion flexes. It should be readily apparent that FIGS. 1 and 2 illustrate the translational geometry for an exemplary 4×5 fiberoptic switch and that a wide variety of other configurations are possible.

Figure 6A:
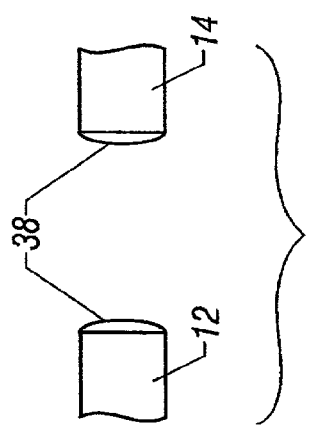
FIG. 6A is a diagrammatic illustration of an alternate embodiment in which each fiber has a lens attached to its facet.
Figure 6B:
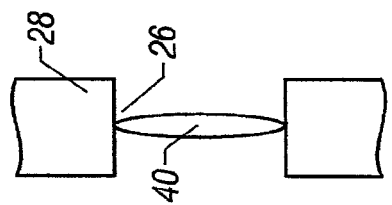
FIG. 6B is a diagrammatic illustration of an alternate embodiment in which a lens is placed in each hole in the central panel.

The facets of the fibers 12 and 14 which are aligned in the switch 10 need not physically contact each other as explained later on in conjunction with FIGS. 6A and 6B. However, in the preferred embodiment of the present invention, the four stages 16 of the input fibers 12, the five stages 18 of the output fibers 14, or both, have mechanical actuators A1–A9 (FIG. 3) for moving the fibers along corresponding Z axes perpendicular to the X and Y axes to physically mate the opposing facets of the aligned input and output fibers 12 and 14. The facets of the optical fibers 12 and 14 are polished end faces and their physical juxtaposition limits optical losses. The four stages 16 (FIG. 1) on the input side of the switch 10 translate along the vertical rails 20. On the output side of the switch 10, the five stages 18 translate along the horizontal rails 22. Once the selected input and output fibers 12 and 14 have been aligned, they are pressed together along a corresponding Z axis to make a fiberoptic connection. In FIGS. 1 and 2 input #1 is connected to output #2, input #2 is connected to output #4, input #3 is connected to output #1, and input #4 is connected to output #3. Output #5 is not connected to any input. The inputs in the preceding sentence are numbered #1 through #4 from left to right in FIG. 1. The outputs are numbered from #1 through #5 from top to bottom in FIG. 2.

The stages 16 and 18 (FIGS. 1 and 2) preferably move polished metal ferrules 24 (FIG. 4) surrounding and encasing the end portions of the optical fibers 12 and 14 into and out of alignment holes 26 (FIGS. 1 and 2) of a central rectangular panel 28. The ferrules 24 can be those designed for use in conventional FC/PC fiber optic connectors. Alternatively, the central panel 28 can be eliminated by permanently attaching flexible split sleeves (not illustrated) to the ends of either the input fibers 12 or the output fibers 14. In this embodiment, no alignment holes 26 or central panel 28 are needed. To form a connection, the ferrules 24 on one side of the switch 10 that are not equipped with split sleeves mate with the ferrules 24 permanently equipped with split sleeves on the other side of the switch 10.

Figure 3:
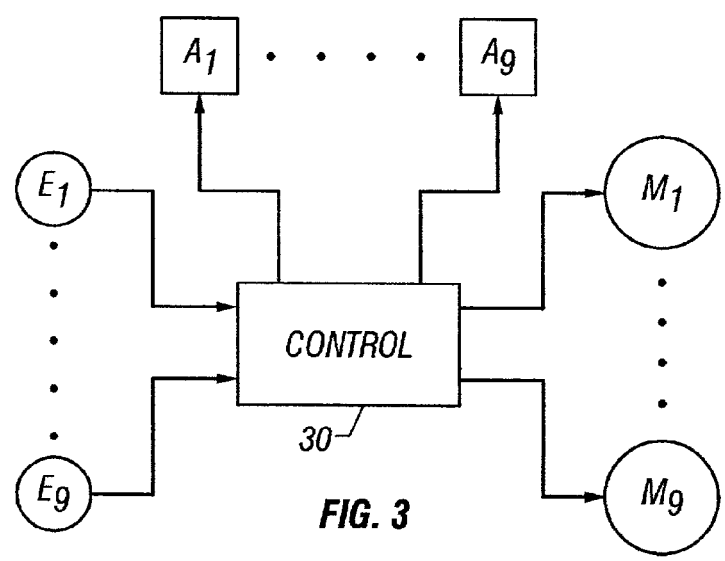
FIG. 3 is a functional block diagram of the electrical control portion of the switch of FIG. 1.

FIG. 3 is a greatly simplified functional block diagram of the electrical control portion of the switch of FIG. 1. A control circuit 30 receives signals from conventional optical encoders E1–E9 each mounted on a corresponding one of the movable stages 16 and 18. These encoders sense stripes formed on wheels that are rotated by translation of the stages 16 and 18 along the rails 20 and 22, respectively, to provide position information. Other conventional position sensing means could be utilized such as Hall effect sensors, laser positioners and the like. The control circuit 30 activates motors M1–M9 which are each mounted on a corresponding one of the stages 16 and 18 for moving the same along the rails 20 and 22. The control circuit further energizes the mechanical actuators A1–A9, each of which is mounted on a corresponding one of the stages 16 and 18 for moving the ferrules 24 along their respective corresponding Z axes to mate and unmate selected ones of the input fibers 12 with selected ones of the output fibers 14.

Figure 4:
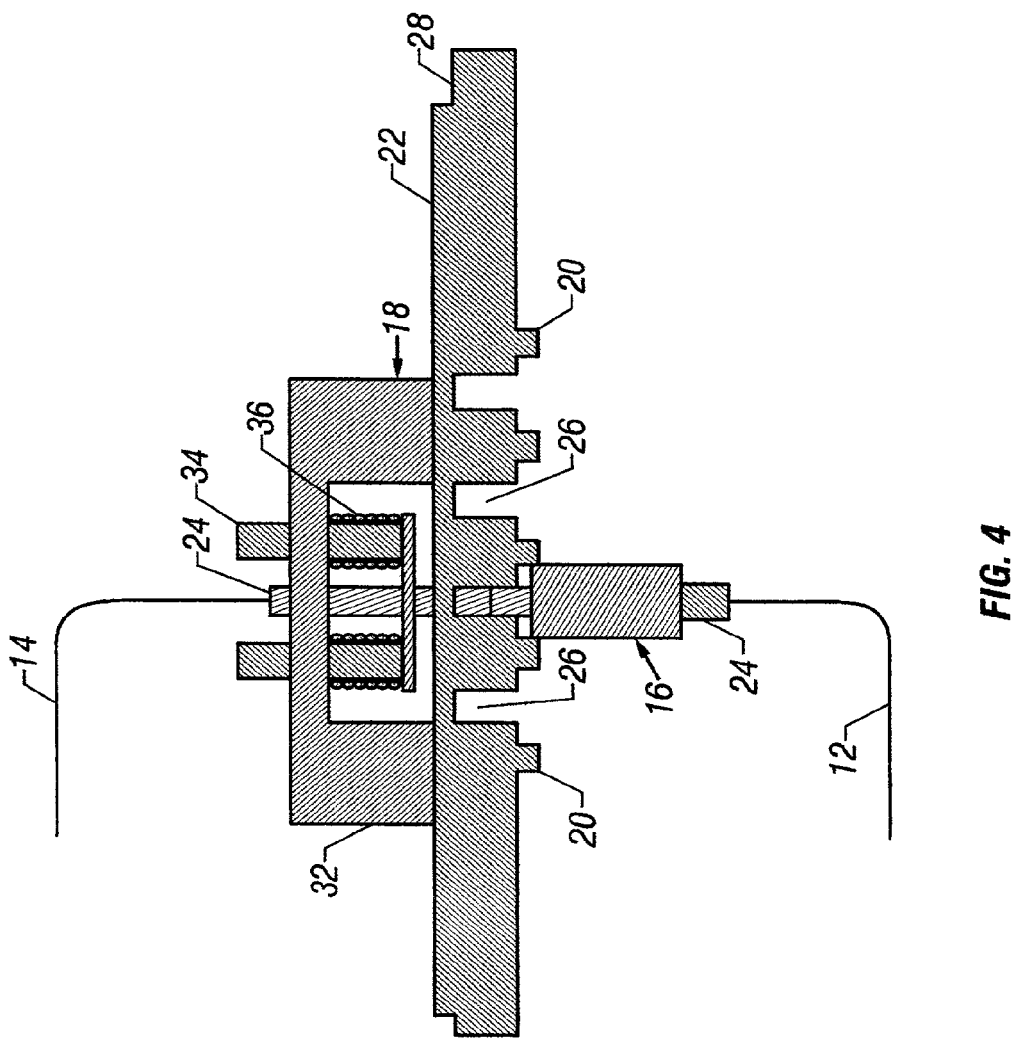
FIG. 4 is an enlarged fragmentary diagrammatic horizontal sectional view of the switch of FIG. 1 illustrating details of its mechanisms for aligning and mating a pair of input and output fibers.

FIG. 4 is an enlarged fragmentary diagrammatic horizontal sectional view of the switch 10 of FIG. 1 illustrating details of its mechanisms for aligning and mating a selected input optical fiber 12 with a selected output optical fiber 14. In FIG. 4, the motors, wheels and gear drives that translate each of the stages 16 and 18 and the mechanical actuators for moving the ferrules 24 are not illustrated. Their particular configurations are not critical to the performance of the subject invention and various designs for the same will readily occur to those of ordinary skill in the art. For example, the same electromechanical designs that are used in X–Y plotters with cable drives, stepper motors and position sensors could be utilized. Each of the ferrules 24 would assume the position previously assumed by the pen of the plotter. The mechanical actuators A1–A9 for moving the ferrules 24 along their respective Z axes could be solenoids or other suitable electro-mechanical devices.

FIG. 4 illustrates one of the stages 18 which has a hollow box-like frame 32. The frame 32 translates along horizontal rails 22, only one of which is visible in FIG. 4. The end portion of one of the output optical fibers 14 is surrounded by a corresponding ferrule 24 captured in the crosspiece of a U-shaped yoke 34 whose parallel cylindrical legs slide in corresponding bores in the frame 32. The yoke 34 and the ferrule 24 are biased downwardly in FIG. 4 by a pair of coil springs 36 that surround the legs and push the ferrule 24 into one of the holes 26 in the panel 28. This allows the facet of the output fiber 14 to physically mate with and abut the facet of a selected one of the input optical fibers 12 whose stage 16 is shown diagrammatically as a cylinder for the sake of simplicity. The stage 16 can translate along a pair of corresponding vertical rails 20. Once aligned with a given hole 26, its ferrule 24 can be inserted into the same. The stage 18 translates left and right in FIG. 4, whereas the stage 16 translate into and out of the drawing sheet.

Each of the ferrules 24 can be moved by a solenoid actuator (not illustrated in FIG. 4) comprising, for example, a ferro-magnetic sleeve fixed around the ferrule 24 and a cylindrical coil of electric wire surrounding the ferro-magnetic sleeve and fixed to the frame 32. Other actuators can be used to move the ferrules 24 such as a piezo-electric transducer, or a motor that moves a rack and pinion gear assembly. Power can be supplied to each of the stages 16 and 18 via slack wires or ribbon cables (not illustrated) or through conductors (not illustrated) embedded in the rails 20 and 22. Those skilled in the art will appreciate that in an alternate embodiment, only one fiber on each side of the switch 10 need move along a corresponding Z axis to mate with an opposing fiber. This simplifies the design because only the input stages 16 or the output stages 18 need be equipped with springs 36 and mechanical actuators.

When power is applied to the solenoid actuator (not illustrated) of the output stage 18 in FIG. 4, its ferrule 24 is moved upwardly, disengaging the ferrule from the hole 26 and compressing coil springs 36. The stage 18 can then be translated into alignment with a new hole 26 in the central panel 28. Once power is cut to the solenoid actuator, the stored energy in the coil springs 36 will push the ferrule 24 into the new hole 26. The input stages 16 on the opposite side of the panel 28 operate in the same fashion. The stages 16 and 18 can be individually translated, translated in groups or all simultaneously translated. Optical fibers that have been inserted into the same hole 26 meet in the center of the panel 28. In case of a power failure, the fibers are biased toward their connected or mated states since the springs 36 will force each yoke 34 downwardly.

Figure 5C:
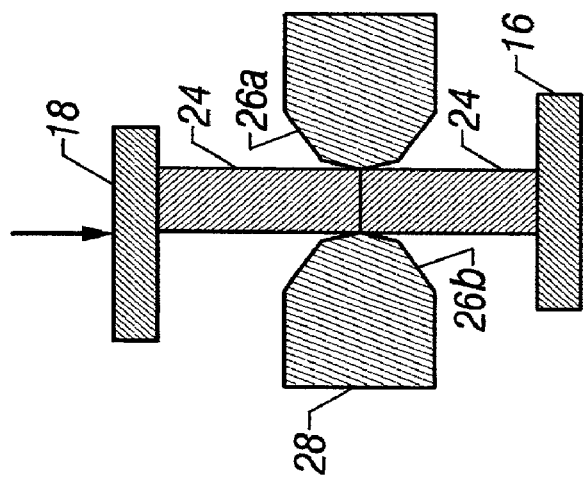
FIGS. 5A, 5B and 5C are enlarged diagrammatic views illustrating angular and centering compliance in the ferrule-stage connection in the switch of FIG. 1.
Figure 5B:
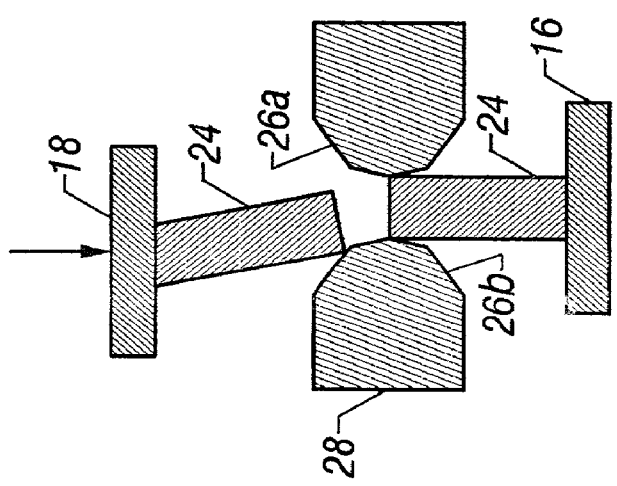
Figure 5A:
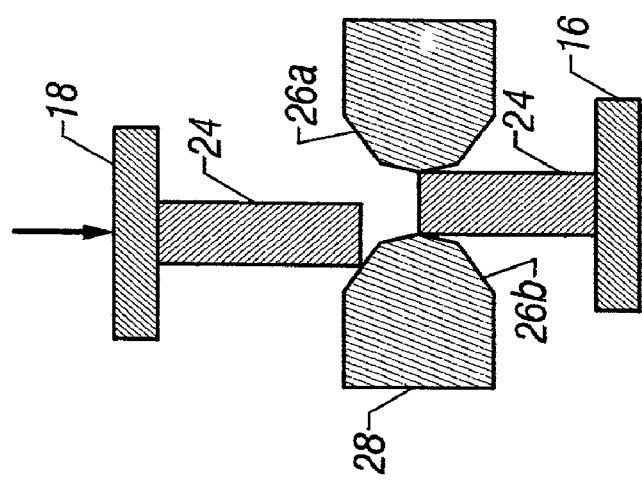

FIGS. 5A, 5B and 5C are enlarged diagrammatic views illustrating angular and centering compliance in the ferrule-stage connection in the switch of FIG. 1. The outer opposite end portions 26a and 26b of the holes 26 in the central panel are tapered. In case of small misalignments of any of the stages 14 and 16, the ferrules 24 will be guided into the holes 26 by the tapered end portions 26a and 26b so that the facets of the selected input and output optical fibers 12 and 14 can mate. Preferably the holes 26 can be gradually tapered so that the minimum diameter occurs about half way through the panel 28. The force of the coil springs is illustrated by the large arrows in FIGS. 5A, 5B and 5C. Optimum alignment of the mated input and output fibers is ensured by precision drilling, punching, molding or other forming of the alignment holes 26 in the central rectangular panel 28 and choosing polished metal ferrules 24 with precisely matched diameters within very close tolerances. The holes 26 could be modeled after those formed in a conventional FC/PC fiber optic connector. Actual connector bulkheads could also be used in the panel 28, however, this design is not preferred because it would not achieve optimum compactness.

The physical size of the switch 10 will depend upon how closely the holes 26 can be spaced. This will in turn depend upon how small each of the stages 16 and 18 can be manufactured. Each stage can have a larger dimension along the direction that it translates. However, in the orthogonal direction, each of the stages 16 and 18 can be no larger (wider) than the spacing between the centers of adjacent ones of the holes 26. Adjacent stages on the same side of the panel 28 must be able to translate past each other. The design of the rails 20 and 22, the translation mechanisms, and the mechanisms for moving the ferrules 24 should be optimized for minimum physical dimensions while at the same time maintaining reliability. The diameter of the ferrules 24 should also be minimized.

The switching speed of the switch 10 will be determined by the time required to lift a ferrule 24 from a current hole 26, translate its stage to a new one of the holes 26 and re-insert the ferrule 24 into the new hole. Clearly the distance between the current and new holes 26 and the speed of translation between the holes will have a major impact on the switching time, particularly if it is necessary for the control circuit 30 to de-accelerate the motion of the stage before it reaches the new hole to ensure that the stage does not over-shoot its mark. Faster translation time, e.g. via increased motor RPM and/or gear ratio, will improve switching time. Switching time can also be lessened by making the electromechanical mechanisms as small and light as possible. The thickness of the panel 28 and the depth of the holes 26 therethrough will also impact switching time. The shallower the hole 26, the less time it will take to extract and re-insert one of the ferrules 24. If the holes 26 are too shallow, however, they may not provide sufficient angular control on the ferrules 24 to guarantee stability and low insertion loss.

Two classes of stage translation mechanisms could be utilized. In the first class, each of the motors M1–M9 moves with one of the nine stages 16 and 18. Each motor may turn a pinion gear (not illustrated) that rolls along a toothed segment of one of the rails 20 and 22. In the second class, each of the motors M1–M9 is stationary and moves a corresponding one of the stages 16 and 18 along a corresponding set of the rails 20 and 22. In one implementation (not illustrated), a cable can be wound about the motor shaft, pulling a stage, which may use rollers or ball bearings to slide along its rails. In another implementation (not illustrated) a pinion gear on the motor shaft translates a toothed rack gear along the stage. In order to maintain symmetry, two motors could be used for each stage, one to pull in each direction. Alignment of each ferrule 24 with each hole 26 can be more accurately achieved by using stepper motors. Instead of using the optical encoders E1–E9, an electrical proximity sensor (not shown) can be used for achieving such alignment. This sensor can be a simple circuit that is only closed when a selected one of the stages 16 and 18 is aligned with one of the holes 26 in the central rectangular panel 28. The corresponding motor can then translate the stage until the correct signal is triggered and received by the control circuit 30. Alternatively, a capacitive or optical sensor could be employed. A coarse translation mechanism could be combined with a CD reader moving with the fiber to accomplish fine alignment control. The rails 20 and 22 could be replaced with arcuate tracks (not illustrated) to permit the use of pivoting actuators used in disk drives. Electrostatic actuators could also be used to move the stages. See U.S. Pat. No. 5,986,381, incorporated herein.

To reduce wear and tear, a non-contact method of aligning the input optical fibers 12 with the output optical fibers 14 can be implemented in our switch 10. A graded-index lens or other collimating device 38 (FIG. 6A) can be attached to the end of each fiber. In this way, the fibers can be brought into alignment with each other but their end facets need not physically mate or abut each other. The lenses 38 allow low loss to be achieved with larger alignment tolerances and with a free space gap between the facets. Alternatively, a single lens 40 (FIG. 6B) could be positioned in each hole 26 in the rectangular panel 28. Thus the fibers 12 and 14 need only translate along X and Y axes, but need not move along corresponding Z axes, making it possible to eliminate the panel 28 and the mechanical actuators A1–A9. To help avoid possible optical crosstalk arising from stray light, an aperture grill (not illustrated) can be added between the planes of the switch 10 to block inter-channel crosstalk.

The non-blocking mechanical fiber optic matrix switch 10 solves the problem of reconfiguring a fiberoptic network in a low-loss, highly reliable manner. The insertion loss of the switch 10 does not depend on the number of input and output channels, allowing large numbers of channels to realized with extremely low loss. The switch 10 only requires power when switching between states. No power is required to indefinitely maintain any selected channel-to-channel configuration. The number of critical components in the switch 10 is proportional to the number of channels. Thus the cost of our switch 10 scales linearly with the number of channels. The switch 10 is less sensitive to variations in temperature and humidity than most prior art pure optical switches. The components and materials used to fabricate the switch 10 are well known and its design thus is highly reliable in the field and presents few environmental, safety and manufacturing risks.

Those skilled in the art will appreciate that we have also provided a novel method of switching beams of light directly between selected ones of N input optical fibers 12 and M optical output fibers 14. The method involves the steps of supporting an end portion of each of the plurality of N input optical fibers 12 for independent translational movement along a first set of parallel paths defined by rails 20, and supporting an end portion of each of the plurality of M output optical fibers 14 for independent translational movement along a second set of parallel paths defined by the rails 22, the paths of the second set being generally orthogonal to the paths of the first set. A selected one of the N input optical fibers 12 and a selected one of the M output optical fibers 14 are translated to align the fibers to permit a light beam to be transmitted from the selected input optical fiber to the selected output optical fiber. The preferred embodiment of our method further comprises the steps of moving at least one of the selected fibers along a corresponding Z axis after alignment has been achieved in order to mate a facet of the selected input optical fiber 12 with a facet of the selected output optical fiber 14. The preferred embodiment of our method further comprises the steps of detecting a position of each of the fibers as its translates along its corresponding path via the encoders E1–E9, for example, and controlling the translation of each of the fibers in accordance with the detected position with the control circuit 30. The preferred embodiment of our method performed by the switch 10 of FIGS. 1–4 performs the additional steps of first translating each of the fibers that is movable along a corresponding Z axis to a course alignment position, and subsequently, during movement along the corresponding Z axis, the fiber is further translated to a fine alignment position as illustrated in FIGS. 5A, 5B and 5C.

While we have described several embodiments of our non-blocking mechanical fiberoptic matrix switch, adaptations and modifications thereof will occur to those skilled in the art. For example, the number of input and output optical fibers can be varied and N may equal M. The switch could be built in a 1×M configuration in which there would only be a single input fiber on a single stage that could translate along one or more paths to align the same with one of a plurality of output fibers with their end portions supported in stationary locations along the paths by ferrules mounted on a panel, or by other suitable means. Only one motor could be used on each side of the switch 10 allowing only one fiber on each side of the switch to be connected at a time. A low cost embodiment would assume only a limited number of translations over the life of the switch and therefore use the split sleeve, mating fiber end approach with no lenses, one slow motor per plane, and plastic rails. The stages carrying the input fibers and output fibers need not be straight and orthogonal to each other. It is sufficient if the input fibers and their stages translate along a first set of paths that overlap with a second set of paths along which the output fibers and their stages translate. Therefore, the protection afforded our invention should only be limited in accordance with the scope of the following claims.

What is claimed is:

1. A non-blocking mechanical fiberoptic matrix switch, comprising:

N input optical fibers;

M output optical fibers;

a first plurality of stages each supporting a ferrule surrounding an end portion of a corresponding one of the N optical fibers;

a second plurality of stages each supporting a ferrule surrounding an end portion of a corresponding one of the M optical fibers;

means for translating the stages along a plurality of orthogonal X and Y axes to align a facet of a selected one of the N input optical fibers with a facet of a selected one of the M output optical fibers;

a central panel having a plurality of holes, each hole being sized for having the ferrule surrounding a selected one of the N input optical fibers inserted into a first end of a selected hole in order to mate the facet of the selected one of the N input optical fibers with the facet of the selected one of the M output optical fibers having the ferrule surrounding its end portion inserted into a second end of the selected hole; and means for moving the ferrules relative to the stages along a plurality of Z axes generally perpendicular to the X and Y axes to mate and un-mate the facets of the selected input and output optical fibers.

2. The switch of claim 1 and further comprising spring means for biasing the ferrules to mated positions.

3. The switch of claim 1 wherein the holes in the central panel are tapered to facilitate alignment and insertion of the ferrules into the holes.

4. The switch of claim 1 wherein the means for moving the ferrules includes a plurality of solenoid actuators.

* * * * *